INVENTOR.
HUGO REISINGER

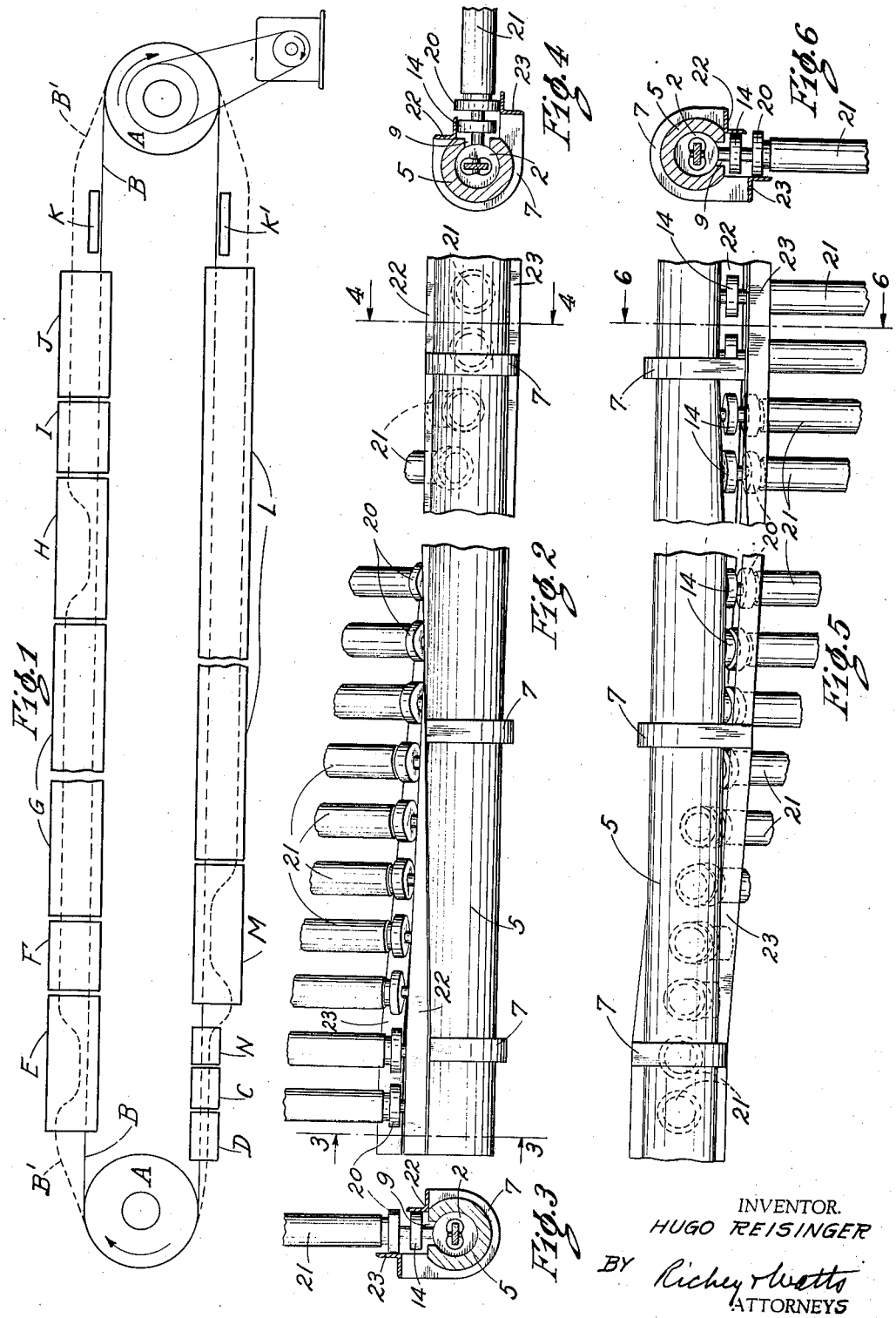

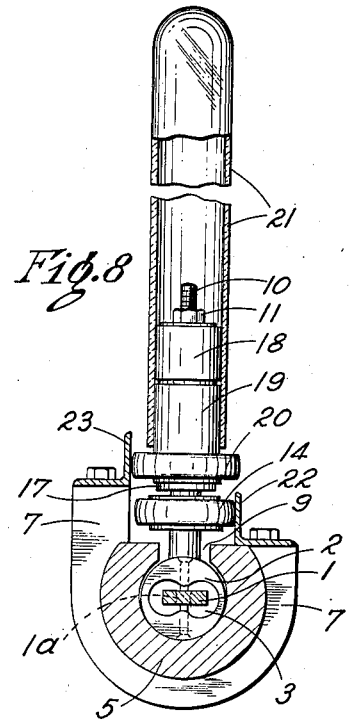
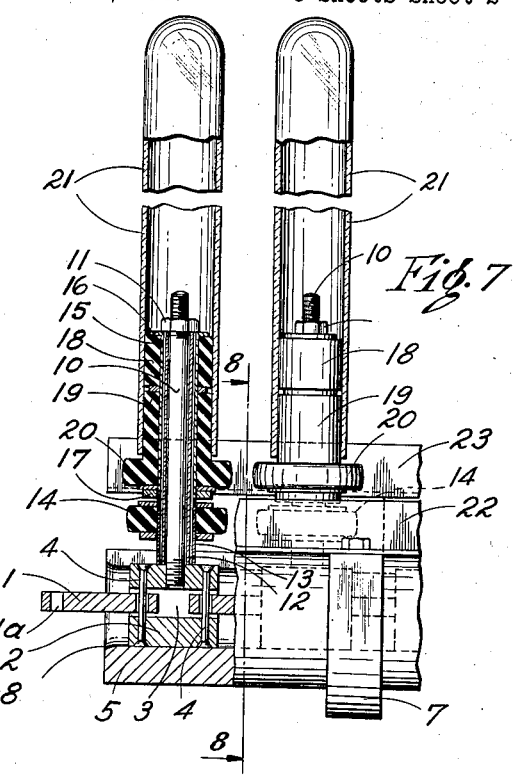
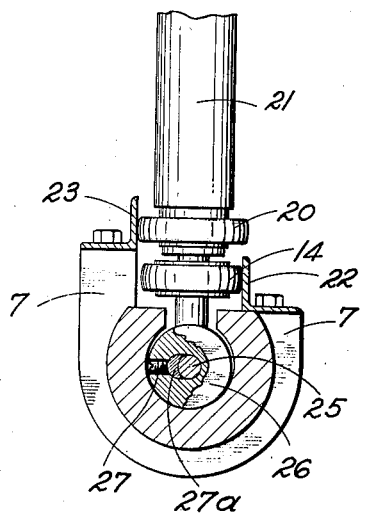
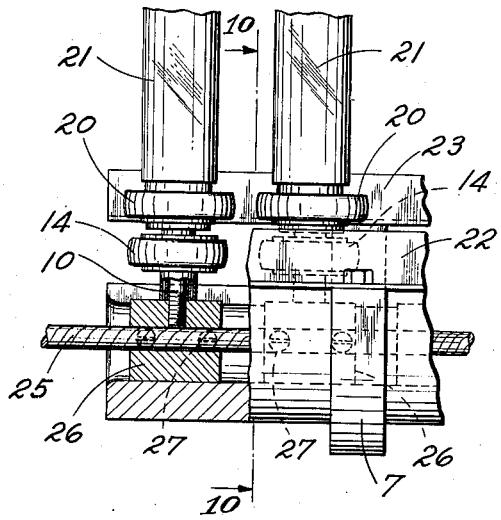

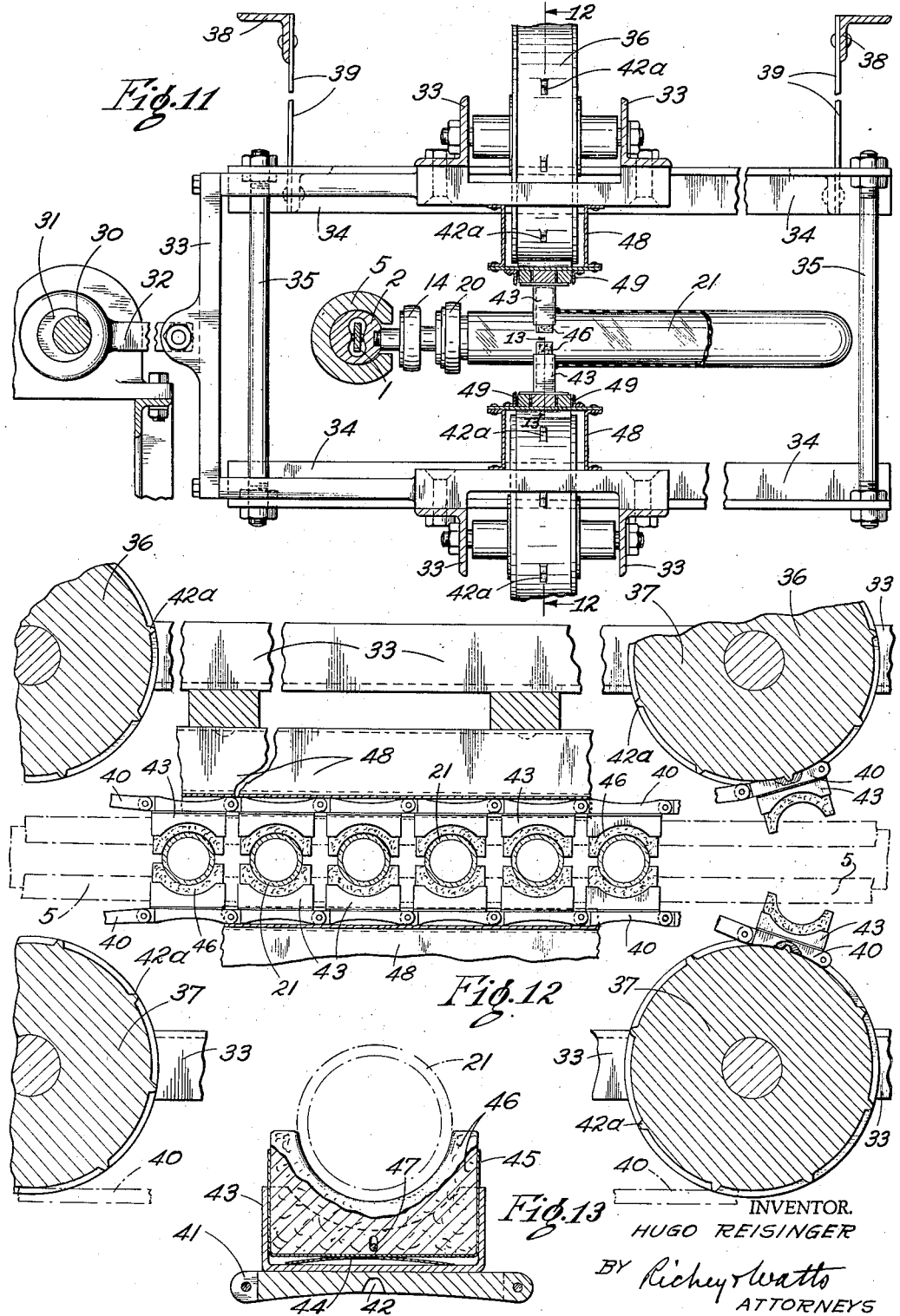

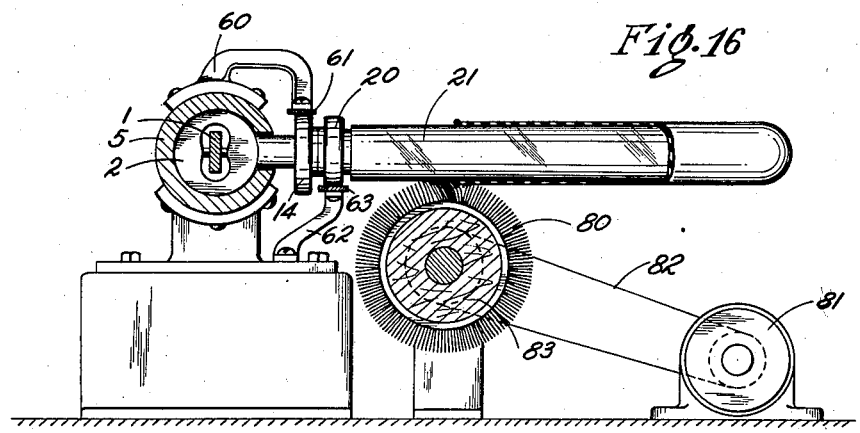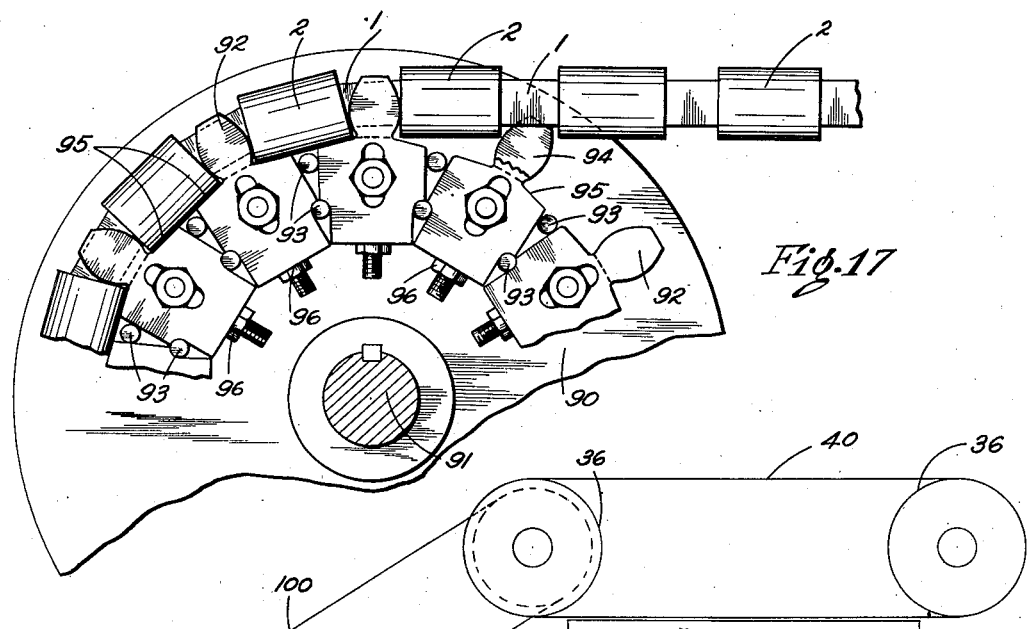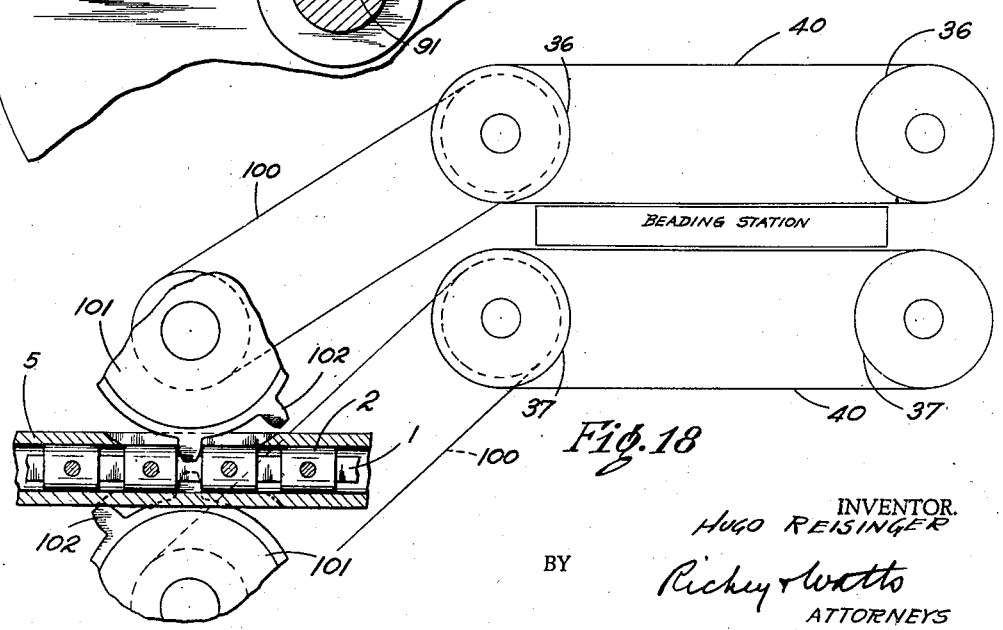

Patented Mar. 4, 1941

2,233,555

UNITED STATES PATENT OFFICE 2,233,555

APPARATUS FOR MAKING THIN DIPPED RUBBER ARTICLES

Hugo Reisinger, Trenton, N. J., assignor to Frank B. Killian & Co., Akron, Ohio, a partnership composed of James Tyrrell, trustee, Perry H. Stevens, Lucy S. Stevens, and Maurice Gusman Application January 18, 1940, Serial No. 314,509

1 Claim. (Cl. 18—2)

This invention relates to the art of making thin dipped rubber articles and is particularly concerned with new and improved apparatus for making such articles from rubber solutions or dispersions such, for example, as latex compounds.

In the drawings accompanying and forming part of the specification,

Figure 1 is a diagrammatic view of a machine embodying the present invention and including several stations where various operations are performed in the manufacture of a thin dipped rubber article;

Figure 2 is a fragmentary side elevational view of a part of the machine of Fig. 1 including forms on the conveyor, a slide for guiding the form carrying conveyor and means for changing the angularity of the forms from a vertically up position to a horizontal position;

Figure 15:
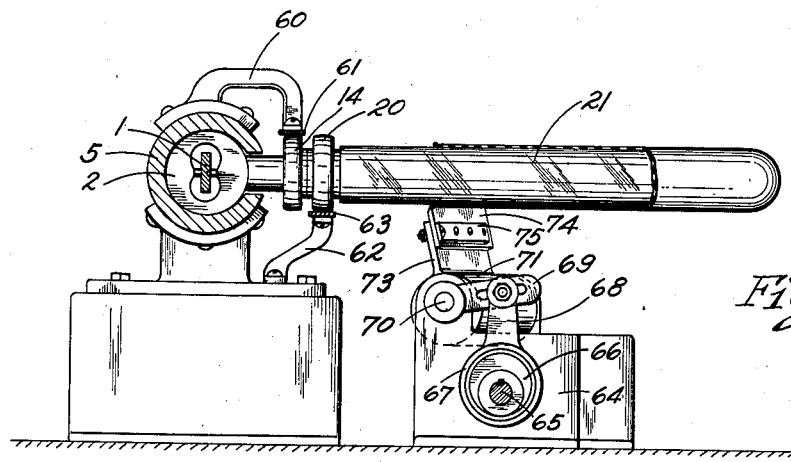
Figure 14:
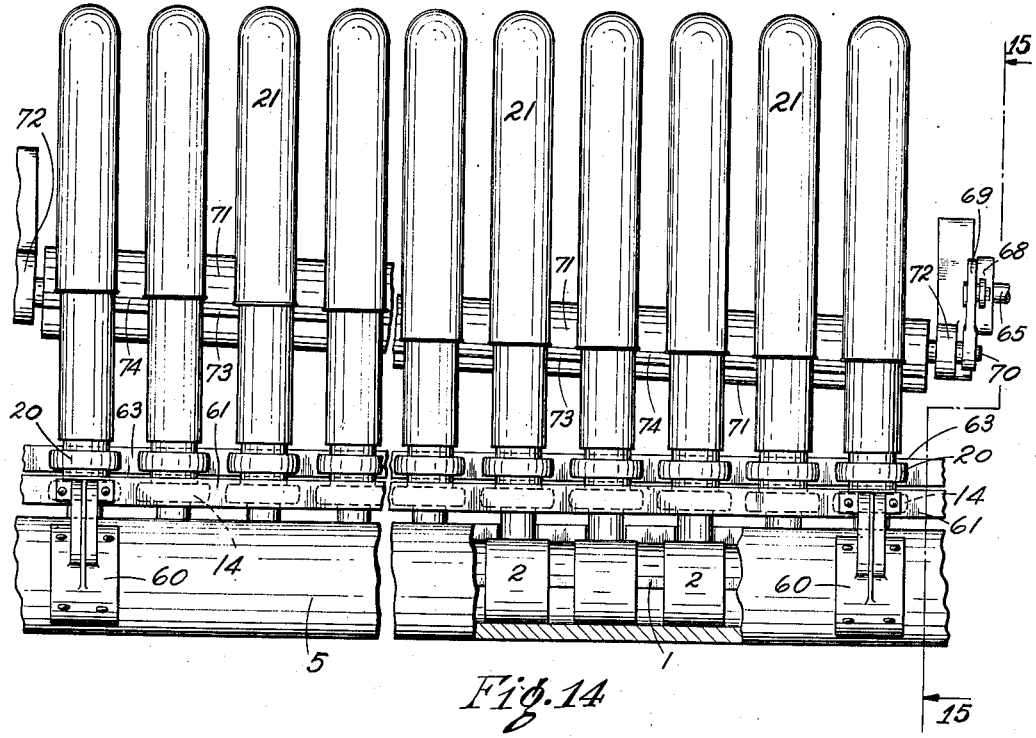

Figures 3 and 4 are transverse views, partly in section, taken on lines 3—3 and 4—4 respectively of Fig. 2;

Figure 5 is a view similar to Fig. 2 showing a continuation of the slide and a further change in the angularity of the forms on the conveyor from a horizontal position to a vertically down position;

Figure 6 is a transverse, partly sectional, view taken on line 6—6 of Fig. 5;

Figure 7 is a fragmentary, side elevational view, partly in section, showing in detail parts of the conveyor, forms, form mountings and slide of Fig. 2;

Figure 8 is a sectional view taken on line 8—8 of Fig. 7;

Figures 9 and 10 are similar, respectively, to Figs. 7 and 8 but showing a modified form of conveyor;

Figure 11 is a transverse view thru the beading station of Figure 1 and showing one form of bead rolling apparatus;

Figure 12 is a sectional view taken on line 12—12 of Fig. 11;

Figure 13 is a fragmentary sectional view taken on line 13—13 of Fig. 11;

Figure 14 is a top plan view, partly in section, of a modified form of bead rolling apparatus embodying the present invention; and Figure 15 is a transverse view, partly in section, taken on line 15—15 of Fig. 14.

Figure 16 is a view similar to Fig. 15, but showing another form of bead rolling apparatus embodying the present invention;

Figure 17 is a top plan view showing the gear A for driving conveyor B, and

Figure 18 is a diagrammatic view showing the mechanism for synchronizing the beading mechanism of Figs. 11 to 13 with the conveyor B.

Fig. 1 shows diagrammatically a machine for automatically making thin dipped rubber goods from rubber in solution or dispersion form, such as latex. As this figure indicates, the machine includes two wheels or sprockets A, one of which is driven, at either end of the machine, and about which an endless conveyor B is moved. This conveyor carries a plurality of form mountings and forms spaced therealong and serves to move these forms successively past different stations where various operations are performed on the forms or on rubber films thereon. Starting, for example, with the form washing station C near the left hand end of Fig. 1, the forms are there washed to remove foreign substances therefrom and are then dried at the next station D. Then the forms are dipped into the first dip tank E where a film of rubber is deposited on the forms, after which the forms pass successively thru a cold tunnel F and a hot tunnel G where, respectively, cold and hot air is brought into contact with the rubber films on the forms. Then the forms are dipped in the second dip tank H to deposit a second layer of rubber on the first layer and these layers are then subjected to treatment with cold and hot air as before in tunnels I and J. The beads are formed on the open ends of the films at the beading station K or stations K and K', after which the forms are passed thru a hot tunnel L where the films of rubber on the forms are thoroughly dried. The forms are then dipped into a tank M containing hot water where the rubber films are vulcanized due to the presence of vulcanizers in the films or in the water, after which the films are dusted at station N, and removed from the forms.

In Fig. 1 the dotted line B' is intended to illustrate approximately the position of the closed ends of the forms, as viewed from above, as the forms pass the several stations. For example, in the tunnels the line B' indicates that the forms are in a horizontal position while in the dip tanks it indicates that they are in a vertically down position and at other places, for example when the forms are moving around the right hand driving sprocket A, it indicates that the forms are in a vertically up position.

As is shown in Figs. 2 to 8 inclusive, the conveyor B consists of a plurality of alternately arranged flat metal links I and cylindrical links 2. The links I have slightly elongated holes I—a near their ends while links 2 are cut away axially to form a space 3 somewhat larger than links I, so that the ends of two links I may be inserted in the space 3 in a link 2 and held there in place by pins 4 which are mounted in links 2 and pass thru holes I—a in links I. A conveyor constructed as just described will permit limited relative turning movement of one link relative to another about their axes, so that in a length of a few feet the conveyor may be twisted thru as much as 180 degrees.

The endless conveyor B comprising links 1 and 2 is supported thruout substantially its entire extent by slides 5. These slides may be provided on the outside with lugs 7 of various shapes by which the slides may be secured to suitable supports. Each slide is generally circular in cross section and has an axial opening sufficiently large to permit links 2 to slide axially therein and each end of such opening is preferably rounded off as is shown at 8 in Fig. 7 for the purpose of guiding links 2 thereinto. Each slide 5 has a radial opening 9 extending outwardly therethru from the axial opening for a purpose which will presently appear.

Where the forms are to move in the same plane for the full length of a slide 5, this radial opening 9 extends in a substantially straight line from end to end of the slide. However, where the angularity of the forms is to change while in the slide, the radial opening 9 extends spirally along the slide, as is indicated in Figs. 2 to 6 inclusive. At the left end of Fig. 2 radial opening 9 is vertically up but extends spirally along slide 5 until it reaches a horizontal position at the right hand end of slide 5, as is indicated in Fig. 4. In Fig. 5, which may be a continuation of the slide 5 of Fig. 2 or another slide, the opening 9 is horizontal at the left hand end of Fig. 5 and extends spirally around the slide, reaching a vertically down position at its right hand end, as is indicated in Fig. 6.

As is more clearly shown in Figs. 7 and 8, each link 2 of the conveyor B has one end of a rod 10 screwed thereinto and a nut 11 at its other end. A metal sleeve 12 surrounds rod 10. A short metal tube 13 is rotatably mounted on sleeve 12, carries a rubber roller 14 near one end and bears on link 2 at its inner end, the roller 14 being disposed adjacent to the outside of slide 5. Another metal tube 15 rotatably surrounds rod 10 and is provided at its outer end with a flange 16 and at its inner end with a nut 17 threaded thereto. Two rubber cylinders 18 and 19 separated by a washer are mounted on tube 15. The lower end of cylinder 19 is enlarged to form a roller 20. When a hollow form 21 of the shape and size of the article desired is telescoped over cylinders 18 and 19 and nut 17 is tightened, these cylinders are compressed axially and expanded radially thereby gripping the form and holding it in place on the cylinders. It will be understood that the rod 10 and sleeves 12 and 13 project thru the radial opening 9 in slide 5 and that rollers 14 and 20 are outside of slide 5, the latter being more remote from the slide.

Rails 22 and 23 are carried by slides 5 on opposite sides of the radial opening 9 to engage respectively with rollers 14 and 20. When the conveyor is moving endwise in a guide 5, roller 14 will engage with rail 22 and roll therealong, since it is free to rotate relative to rod 10, while roller 20 will engage with rail 23 and roll therealong, since it also is free to rotate around rod 10. Thus rollers 14 and 20 may rotate in opposite directions. The rails 22 and 23 being positioned relative to radial opening 9, serve to guide the forms and keep them approximately centered in the radial opening 9 regardless of how it spirals about slide 5.

In Figs. 9 and 10 is shown a modified form of conveyor. In these figures the cable 25 is endless and twistable and has cylindrical members 26 attached thereto at spaced intervals, as by set screws 27 bearing against a block 27—a which is forced against the cable. Each of these members 26 carries a rod 10 and form-mounting parts substantially as has just been described. The members 36 correspond to the links 2 described above and shown in Fig. 7.

In Figures 11, 12 and 13 is shown one form of bead forming apparatus embodying the present invention.

In Figure 11 the shaft 30 is supported in suitable bearings, and is attached to means (not shown) for rotating it; and carries a plurality of eccentrics 31. Connecting rods 32 encircling each eccentric are connected to a plate 33. This plate is carried by a framework comprising two similar ends, each composed of top and bottom horizontal members 34, and front and rear side members 35, and cross members 33. The top pair of angles 33 carry near the ends thereof two sprockets 36 (Fig. 12). Similarly the lower pair of angles 33 carry a corresponding pair of sprockets 37.

The frame just described is supported from above by stationary members 38 and flexible steel straps 39 which flex to permit the frame to move horizontally when the connecting rods 32 are reciprocated by rotation of shaft 30.

Endless belts 40 are carried by sprockets 36 and 37 respectively. Each belt 40 is composed of links 41 hinged to each other, and each link has a recess 42 corresponding to the projections 42—a on the sprockets 36 and 37. Each link 41 carries an elongated cup 43 in which is mounted a curved spring 44, a rectangularly shaped spring 45 and a bead forming wiper 46 composed of any suitable material and having a form engaging surface which is substantially semi-cylindrical. A cotter pin 47 extends through the side walls of cup 43 and through member 46 serving to retain members 44, 45 and 46 in cup 43. The hole in member 46 for cotter pin 47 is elongated as shown in Figure 13, so that the members 45 and 46 may move outwardly of cup 43 under the influence of spring 44.

Between the pairs of sprocket wheels 36 and 37 and within belts 40 are disposed supports 48 attached to angles 33. These supports 48 carry guides 49 in which the belts 40 slide.

A slide 5 for conveyor B is disposed between the members 34 of the frame and is supported independently of the frame. The conveyor B carries form mountings and forms 21 as shown in other figures and already described.

The members 46 engage a form for a considerable length of travel, for example, four feet, and in order that the film may be rolled into a bead of the desired size, the belts 40 are inclined at a small angle to the conveyor B. Thus the members 46 which engage the end of the film when they first grip a form, will push and roll the film along the form for a distance of an inch or so due to this slight angularity.

When the belts 40 are actuated in synchronism with the conveyor B, two opposed members 46 are brought into engagement with a form 21 substantially encircling the form, as shown in Fig. 12. Since the members 46 are reciprocated axially of the form, the open end of the thin rubber film on the form will be progressively pushed and rolled upon itself toward the closed end of the form, thereby forming a strengthening bead on the article on the form.

In Figs. 14 and 15 is shown another form of bead forming apparatus embodying the present invention and usable in connection with the above described machine.

In Figures 14 and 15 the slide 5 is so disposed that the forms 21 travel lengthwise thereof in a horizontal plane. Brackets 60 on the top of slide 5 carry a rail 61 to engage rollers 14 of the form-mountings, while brackets 62 carry a rail 63 to engage rollers 20 of the form mountings.

In spaced supports 64 is mounted a rotatable shaft 65 carrying an accentric 66 around which is fitted an accentric strap 67 having a projecting arm 68 pivotally and adjustably connected in a slotted arm 69 which is keyed to one end 70 of a cylinder 71 which, at its ends, is mounted in bearings 72. This cylinder 71 is horizontally disposed and extends at a slight angle to the axes of form 21 as is illustrated in both Figures 14 and 15. The cylinder 71 carries a projecting plate 73, which at its outer end is provided with a wiper 74 attached thereto by a binding strip 75. The wiper 74 may be composed of any material, such as felt or leather, which is suitable for the purpose of pushing the open ends of the rubber films on the forms 21 toward the closed ends of the films and rolling the film upon itself, thereby forming a strengthening bead at the open end of the rubber articles. The shaft 65 may be rotated by any suitable means.

When the conveyor B moves forms 21 lengthwise of the wiper 74 and the wiper is reciprocated toward and away from the closed ends of the forms 21, the partially dried but uncured, and unvulcanized films of rubber on the forms will be progressively, and in small increments, pushed and rolled toward the closed end of the film, and since the forms are being rotated as they move lengthwise of the wiper 74, the open ends of the rubber film on each form will be progressively pushed and rolled toward the closed end of the form by application of such pushing action around the circumference of the forms, so that by the time the forms have travelled the full length of the wiper 74 strengthening beads at the open ends of the rubber articles will have been formed entirely around the articles and these beads will all be brought to the same distance from the closed ends of the forms and will be substantially perpendicular to the axes of the forms.

In Figure 16 is shown another form of bead rolling apparatus embodying the present invention. The parts of this apparatus which are like that of Figs. 14 and 15 are numbered as in those figures and will not be redescribed here. The rotary bristle brush 80 is mounted at its ends in suitable bearings (not shown) similar to bearings 72 of Fig. 14. The brush may be rotated as by a motor 81, belt 82, and pulley 83 keyed to the shaft of brush 80. The brush 80 is long enough to engage a plurality of forms 21 and its axis is inclined at a small angle to the longitudinal axis of the forms, in the manner the wiper 74 of Fig. 14 is inclined to those axes.

When the brush 80 is rotated, clockwise in Fig. 16 and the conveyor B is propelled to move forms along the brush, the forms are confined to travel in a plane by rails 62 and 63 engaging rollers 14 and 20, the forms are rotated by roller 20 rolling on rail 63, and the films on the forms will be rolled upon themselves from their open ends toward their closed ends, thus producing strengthening beads on the articles.

While Figure 16 shows a bristle brush it will be understood that any material may be employed instead of bristles which will operate to push or roll the rubber films upon themselves to form a bead on the articles.

In Figure 17 is shown the wheel A which drives conveyor B. This wheel consists of a hub 90 keyed to a shaft 91 which is driven by a suitable gear (not shown). Hub 90 carries a plurality of separate gear teeth 92 positioned between pins 93. The end of each tooth 92 is bifurcated as at 94 to provide a space for the link 1 or cable 25 when the tooth is between the links 2 or blocks 26 and the links 2 or blocks 26 are resting on the shoulders 95 of the gear teeth. Adjusting set screws 96 serve to prevent the teeth from moving inward radially of hub 90. The radial adjustability of teeth 92 insure proper meshing of the teeth with the conveyor as wear of the holes 1—a and pins 4 takes place for as the teeth are moved radially outward the circumferential distance between the teeth is increased.

Figure 18 illustrates diagrammatically means to insure proper meshing of the forms 21 in the semi-circular bead rolling members 46 of the apparatus of Figs. 11–13. Each endless belt 40 is driven by a chain 100 which is actuated by a gear wheel 101 having teeth 102 spaced apart a distance equal to the distance between two adjacent forms 21. The gear wheels 101 are rotated by engagement of the teeth 102 with the leading ends of links 2 or blocks 26 and thus the bead rolling members 46 are always in proper position within respect to the forms.

From the foregoing description it will be understood that the form carrying cylindrical member, for example links 2 or blocks 26, are turnable about their longitudinal axes; that the rails engaging the wheels 14 and 20 of the form mountings will so turn such members about their axes and thereby shift the angularity of the forms, that is, move the forms from one plane to another plane; and that when the conveyor B moves endwise in a slide 5 having spiral rails the form carrying members will be turned about their axes and the angularity of the forms will be changed.

It will be understood that when the apparatus of Figs. 2 to 10 inclusive is used either with the reciprocable bead forming apparatus of Figs. 14 and 15 or the rotary bead forming apparatus of Fig. 16, the forms are, preferably, rotated as by the engagement of the rails and rollers; but that when the bead forming apparatus of Figs. 11–13 is used, the forms are preferably not rotated.

Having thus described the present invention so that others skilled in the art may be able to understand and practice the same, I state that what I desire to secure by Letters Patent is defined in what is claimed.

What is claimed is:

Apparatus of the class described comprising an endless conveyor including cylindrical members, a fixed tube-like member embracing said conveyor and constituting a slide therefor, said member having a longitudinally extending radial opening, the transverse curvature of said member being sufficient to maintain said cylindrical members therewithin, rods attached to and projecting from said cylindrical members through said radial opening, form assemblies rotatably mounted on said rods, each said assembly including rollers spaced axially along said rod, one of said rollers including a tubular extension composed of deformable rubber, a tubular form surrounding said extension, and means for compressing said extension axially and thereby expanding it laterally into close fitting engagement with said form, and a fixed rail along said radial opening and engaging with the form carrying rollers.

HUGO REISINGER.